Feb. 1, 1966 M. A. SWEENEY, JR 3,232,270
ANIMAL BEDS
Filed Feb. 25, 1963 3 Sheets-Sheet 1
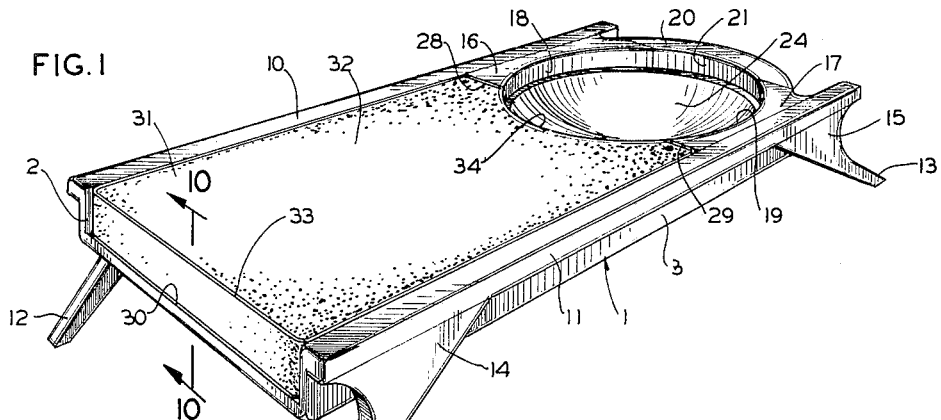
FIG. 1
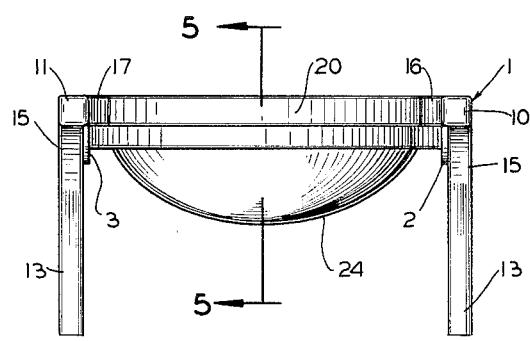
FIG. 2
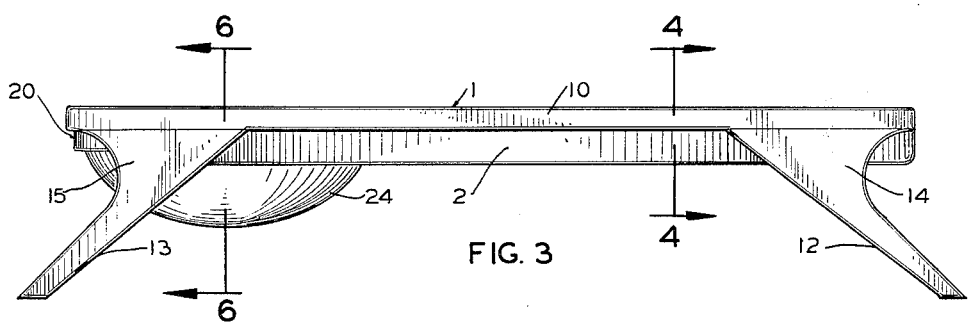
FIG. 3
FIG. 4
INVENTOR.
MARTIN A. SWEENEY, JR.
BY
ATTORNEY Feb. 1, 1966    M. A. SWEENEY, JR    3,232,270
ANIMAL BEDS
Filed Feb. 25, 1963    3 Sheets-Sheet 2
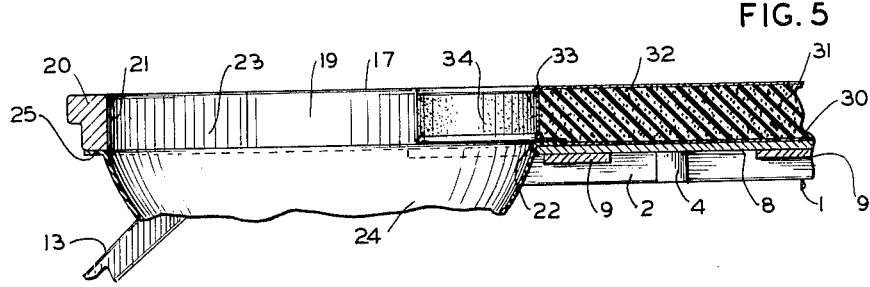
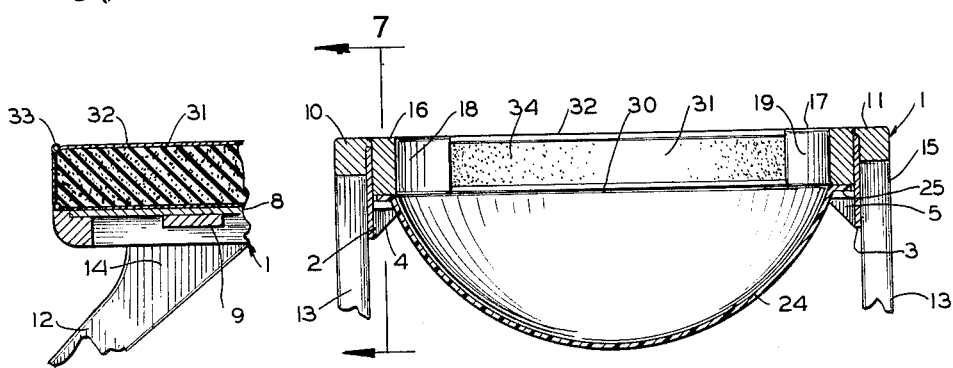
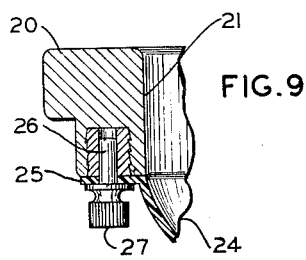
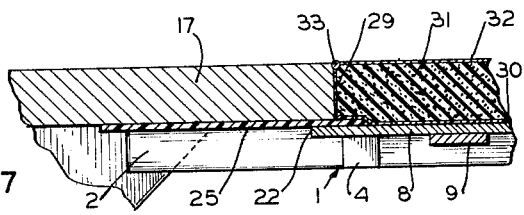
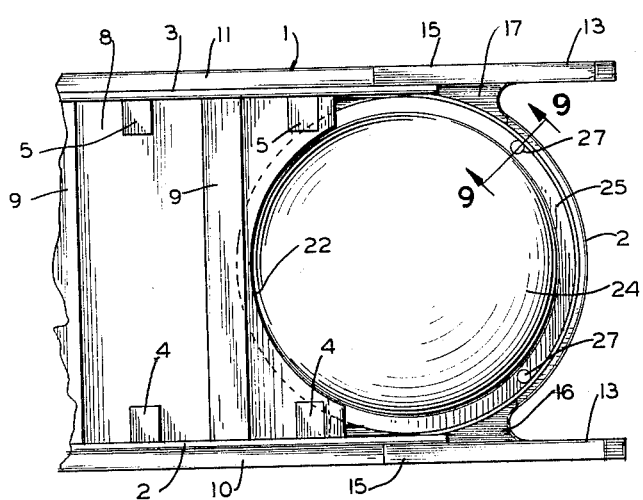
INVENTOR.
MARTIN A. SWEENEY, JR.
BY
ATTORNEY

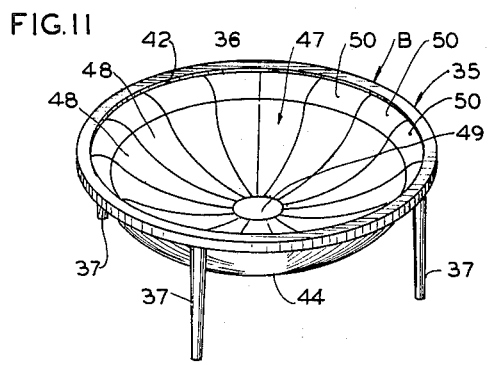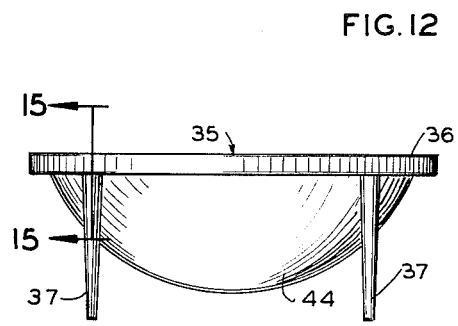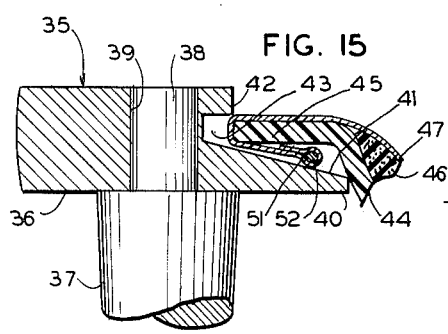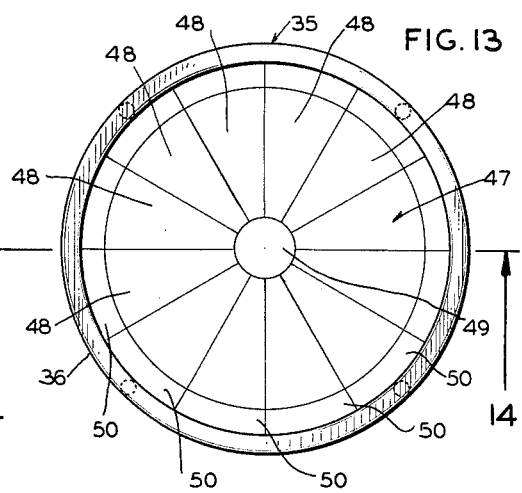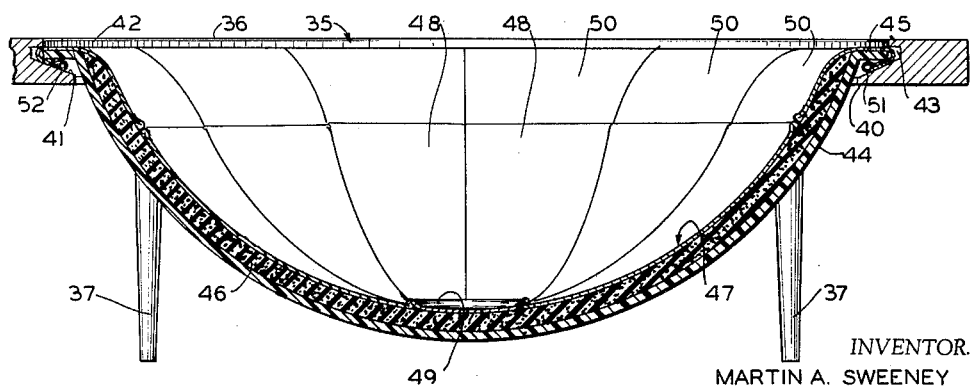
INVENTOR.
MARTIN A. SWEENEY
ATTORNEY

3,232,270
ANIMAL BEDS
Martin A. Sweeney, Jr., Chicago, Ill., assignor to John Sweeney & Company, St. Louis, Mo.
Filed Feb. 25, 1963, Ser. No. 260,545
3 Claims. (Cl. 119—1)

This invention relates in general to certain new and useful improvements in animal beds and, more particularly, to an improved type of dog pad.

It is the primary object of the present invention to provide an animal bed which is light in weight, occupies a small amount of floor space, and can be easily transported.

It is another object of the present invention to provide an animal bed of the type stated which permits the animal to assume a stretched out or curled up position.

It is a further object of the present invention to provide an animal bed of the type stated which is constructed to resemble an expensive piece of furniture and which matches the other articles of furniture in a room.

It is also an object of the present invention to provide an animal bed of the type stated which is sturdy in construction and relatively inexpensive to manufacture.

With the above and other objects in view, my invention resides in the novel features of form, construction, arrangement, and combination of part presently described and pointed out in the claims.

In the accompanying drawings (three sheets):

FIG. 1 is a perspective view of an animal bed constructed in accordance with and embodying the present invention;

FIG. 2 is an end elevational view of the animal bed in FIG. 1;

FIG. 3 is a front elevational view of the animal bed in FIG. 1;

FIG. 4 is a fragmentary sectional view taken along line 4—4 of FIG. 3;

FIG. 5 is a fragmentary sectional view taken along line 5—5 of FIG. 2;

FIG. 6 is a fragmentary sectional view taken along line 6—6 of FIG. 3;

FIG. 7 is a fragmentary sectional view taken along line 7—7 of FIG. 6;

FIG. 8 is a bottom plan view, partly broken away, of the animal bed of FIG. 1;

FIG. 9 is a fragmentary sectional view taken along line 9—9 of FIG. 8;

FIG. 10 is a fragmentary sectional view taken along line 10—10 of FIG. 1;

FIG. 11 is a modified form of animal bed constructed in accordance with and embodying the present invention;

FIG. 12 is a side elevational view of the animal bed of FIG. 11;

FIG. 13 is a top plan view of the animal bed of FIG. 11;

FIG. 14 is a vertical sectional view taken along line 14—14 of FIG. 13; and

FIG. 15 is a fragmentary sectional view taken along line 15—15 of FIG. 12.

Referring now in more detail and by reference characters to the drawings, which illustrate practical embodiments of the present invention. A designates an animal bed for small household pets, such as dogs, cats, and the like, which comprises a frame 1 consisting of a pair of spaced parallel longitudinal side rails 2, 3, preferably formed of ⅜ inch thick plywood. Glued or otherwise rigidly secured to the interior vertical faces of the rails 2, 3, adjacent their lower margins is a plurality of longitudinally spaced gluing blocks 4, 5, having flat top faces 6, 7. Secured to the flat faces 6, 7, of the blocks 4, 5, is a base 8 also formed of ⅜ inch thick plywood. Moreover, the base 8 is reinforced by a plurality of longitudinally spaced transversely extending cross-rails or battens 9, which are secured to the under side of the rails 2, 3.

Glued or otherwise rigidly secured to the exterior surfaces of the rails 2, 3, along their upper margins are longitudinal support bars 10, 11, and secured to the under side of the support bars 10, 11, adjacent each of their transverse ends are diagonally extending legs 12, 13, each being provided with large upper ends 14, 15, respectively. By reference to FIGS. 1 and 2, it can be seen that the upper ends 14, 15, are also glued to the exterior faces of the rails 1, 2, respectively.

Secured to the interior vertical faces of the support bars 10, 11, are spacer blocks 16, 17, having top faces which are flush with the top faces of the support bars 10, 11, and are also provided with interiorly presented arcuate side faces 18, 19, respectively. Secured to the outer ends of each of the spacer blocks 16, 17, is an arcuate connecting block 20 having an interiorly presented arcuate face 21, which, in effect, forms a continuation of the arcuate faces 18, 19, all as can best be seen in FIG. 1. Referring now to FIG. 5, it can be seen that one transverse end of the base 8 is provided with an arcuate recess 22, which, in effect, forms a continuation of the arcuate faces 18, 19, 21, and together form an aperture 23 for accommodating a dish-like pan or so-called "cuddle cup" 24 having an enlarged radial lip 25. The lip 25 is engaged by the upper surface of the base 8 along the recess 22. The other side of the pan 24 is supported by a pair of bolts 26 which are secured to the under side of the arcuate connecting block 20. The bolts 26 are provided with diametrally enlarged washers 27 which engage the under side of the lip 25 and hold the lip 25 snugly against the under side of the arcuate block 20. The upwardly presented surface of the pan 24 has a somewhat "quilted" appearance. However, if desired, a soft rubber pad (not shown) can be disposed in the pan 24.

The base frame 1 is preferably formed of high quality wood and can be finished so that it closely resembles the other pieces of furniture in a room and somewhat conforms to the general furniture decorative scheme. The spacer blocks 16, 17, are provided with transversely presented end faces 28, 29, and, with the interior faces of the rails 2, 3, and the upper surface of the base 8, form a tray-like recess 30 for accommodating a foam rubber pad 31, which is preferably provided with a removable cloth cover 32. The cover 32 is conventionally provided with welts 33 along each of its seams. By reference to FIGS. 1 and 4, it can be seen that the pad 31 has a vertical dimension which is substantially equal to the dimension of the recess 30, so that its top face, in effect, is flush with the top face of the rails 2, 3. The foam rubber pad 31 is also provided with a recess 34 along one transverse margin for providing a relief in the area of the aperture 23, substantially as shown in FIG. 1.

Thus, it can be seen that the animal pad A can be manufactured and finished so that it will conform to the decorative furniture scheme of the particular room. Inasmuch as the cover 32 is removable, it can be washed after a period of time. It can be seen that the pad A may be effectively used by the household pet for reclining in a prone position or for curling up in a circular position.

It is possible to provide a modified form of animal bed B, substantially as shown in FIGS. 11 to 15, inclusive, which comprises a base frame 35 consisting of a circular rail 36. A plurality of circumferentially spaced legs 37 is secured to the under side of the rail 36 in the manner as shown in FIG. 11. The rails are provided at their upper ends with integrally formed dowels 38 which are sized to extend in apertures 39 formed on the under side of the rail 36 and are retentively held by a wood glue normally used in securing two pieces of wood. The frame 35 is preferably formed of high quality wood and is finished so that it can conform to the decorative furniture scheme of a particular room.

The rail 36 is integrally formed along its interior face with a lower inwardly extending angular support flange 40 having an inclined top face 41. The rail 36 is also integrally formed along its uppermost surface with an inwardly extending annular flange 42 which is spaced from the upper surface 41, thereby from an annular groove 43, all as can best be seen in FIGS. 14 and 15. Disposed within the aperture formed by the circular rail 36 is a concave dish-shaped retainer pan 44 having an annular bead 45 which is retained on the upper surface 41 of the annular flange 40. The retainer pan 44 is constructed in similar manner as is the retainer pan 24 and is formed of a relatively rigid plastic or synthetic resin material.

A foam rubber cushion or pad 46 is disposed within the retainer pan 44 and is covered by a fabric cover 47, which is formed by a plurality of somewhat triangularly shaped panels 48, which are all adjoined along a common margin at their lower ends to a circular panel 49. The panels 48 are sewn in such manner that they are concave upwardly forming the fabric cover 47. Stitched or otherwise rigidly secured to the upper margins of the panels 48 are panels 50 which extend over the bead 45 and are turned down and stitched upon themselves in the provision of an aperture 51 for accommodating a draw string 52. It can be seen by reference to FIG. 14 that the upper panels 50 are retentively held in the groove 43 by the weight of the retainer pan 44. It can thus be seen that, by pulling the draw string 52, the entire cushion or pad 44 may be removed from the retainer pan 44 for cleaning.

It should be understood that changes and modifications in the form, construction, arrangement, and combination of the several parts of the animals beds may be made and substituted for those herein shown and described without departing from the nature and principle of my invention.

Having thus described my invention, what I claim and desire to secure by Letters Patent is:

1. An animal bed comprising a pair of spaced rails, a horizontal plate connecting said rails, a plurality of legs operatively associated with said rails for supporting said rails, a circular frame-forming member operatively attached to said rails and disposed in a horizontal plane, a first animal-supporting member attached to said circular frame-forming member and extending downwardly below the frame-forming member in the provision of a bowl in which the animal can curl up, and a second animal-supporting member disposed on and extending horizontally across said plate in the provision of a substantially flat elongated pad upon which the animal can rest in a substantially horizontal stretched-out position.

2. An animal bed comprising a pair of spaced rails, a horizontal plate connecting said rails, a pair of support bars secured to the exterior surfaces of said rails, a plurality of legs attached to said support bars and said rails for supporting said rails, a circular frame-forming member operatively attached to said rails and disposed in a horizontal plane, a first animal-supporting member attached to said circular frame-forming member and extending downwardly below the frame-forming member in the provision of a bowl in which the animal can curl up, and a second animal-supporting member disposed on and extending horizontally across said plate in the provision of a substantially flat elongated pad upon which the animal can rest in a substantially horizontal stretched-out position.

3. An animal bed comprising a pair of spaced rails, a horizontal plate connecting said rails, a plurality of legs operatively associated with said rails for supporting said rails, a circular frame-forming member operatively attached to said rails and disposed in a horizontal plane, a first animal-supporting member attached to said circular frame-forming member and extending downwardly below the frame-forming member in the provision of a bowl in which the animal can curl up, said first animal-supporting member having its concaved surface presented upwardly, and a second animal-supporting member disposed on and extending horizontally across said plate in the provision of a substantially flat elongated pad upon which the animal can rest in a substantially horizontal stretched-out position.

References Cited by the Examiner

UNITED STATES PATENTS

| | | | |
|---|---|---|---|
| 1,890,163 | 12/1932 | Rose | 119—1 X |
| 1,976,234 | 10/1934 | Larson | 119—1 X |
| 3,061,373 | 10/1962 | Sarchia | 297—418 |

FOREIGN PATENTS

| | | |
|---|---|---|
| 358,036 | 9/1931 | Great Britain. |
| 446,405 | 4/1936 | Great Britain. |
| 526,778 | 9/1940 | Great Britain. |

SAMUEL KOREN, *Primary Examiner.*

HUGH R. CHAMBLEE, *Examiner.*